United States Patent
Lapota et al.

(10) Patent No.: US 7,690,247 B1
(45) Date of Patent: Apr. 6, 2010

(54) AUTONOMOUS BIOBUOY FOR DETECTING A CHARACTERISTIC OF A MARINE BIOSPHERE AND METHOD OF ASSEMBLING THE BIOBUOY

(75) Inventors: David Lapota, San Diego, CA (US); Gregory Wayne Anderson, San Diego, CA (US); Stephen Lieberman, La Mesa, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 480 days.

(21) Appl. No.: 11/725,713

(22) Filed: Mar. 20, 2007

(51) Int. Cl.
G01N 29/00 (2006.01)
G01C 5/00 (2006.01)
(52) U.S. Cl. .................. 73/61.51; 73/170.29
(58) Field of Classification Search ............. 73/61.51
See application file for complete search history.

(56) References Cited

U.S. PATENT DOCUMENTS

| 3,248,939 | A | * | 5/1966 | Silverstein | ............... | 73/170.34 |
| 3,267,419 | A | * | 8/1966 | Silverstein | .................. | 340/850 |
| 5,264,906 | A | | 11/1993 | Ferer | | |
| 5,350,922 | A | * | 9/1994 | Bartz | ...................... | 250/338.5 |
| 5,481,904 | A | | 1/1996 | Fleck, Sr. et al. | | |
| 5,840,572 | A | | 11/1998 | Copeland | | |
| 6,570,176 | B1 | * | 5/2003 | Fucile | ......................... | 250/573 |
| 7,034,327 | B2 | * | 4/2006 | Fucile | ......................... | 250/573 |
| 7,213,532 | B1 | * | 5/2007 | Simpson | ...................... | 114/331 |
| 7,258,836 | B2 | * | 8/2007 | Hill et al. | ...................... | 422/50 |
| 7,450,467 | B2 | * | 11/2008 | Tveide et al. | .................. | 367/16 |
| 7,525,213 | B2 | * | 4/2009 | Nagata et al. | .................. | 290/53 |
| 7,559,236 | B1 | * | 7/2009 | Lapota et al. | ............ | 73/170.29 |

OTHER PUBLICATIONS

Laurence Lippsett, "New Instrument Sheds Light on Bioluminescence", Oceanus, Nov. 29, 2006, Woods Hole Oceanographic Institution, Woods Hole, Massachusetts.
D. Lapota, "Development of an Autonomous Bioluminescence Buou (BioBuoy) for Long-Term Ocean Measurements", IEEE Oceans, 2002, vol. 1, pp. 396-401, Institute of Electrical and Electronics Engineers.
David Lapota, "Buoy-Mounted Bioluminescence Sensor (BioBuoy) for Special Operations", Intelligence, Surveillance, and Reconnanaissance, 2003, pp. 142-145.
D. Lapota, "Development of an Autonomous Bioluminescence Buoy for Environmental Measurements", Marine Environmental Update, Summer 2002, vol. FYO2, No. 3, p. 15 Marine Environmental Support Office Marine Environment & Applied Sciences.
Unpublished Patent Application Lapota, David et al.; U.S. Appl. No. 11/726,205, filed Mar. 20, 2007.
Office Action for U.S. Appl. No. 11/726,205 mailed Jun. 16, 2008.

* cited by examiner

*Primary Examiner*—Hezron Williams
*Assistant Examiner*—Rodney T Frank
(74) *Attorney, Agent, or Firm*—Kyle Eppele; Walter S. Stevens; J. Eric Anderson

(57) ABSTRACT

Autonomous biobuoy for detecting a characteristic of a marine biosphere and method of assembling the biobuoy. An autonomous biobuoy is provided for detecting a characteristic of a marine biosphere, comprising a detector assembly for detecting the characteristic of the marine biosphere, the detector assembly capable of generating a detector assembly output signal responsive to the characteristic detected thereby and a transmitter coupled to said detector assembly for broadcasting the detector assembly output signal.

21 Claims, 12 Drawing Sheets

AUTONOMOUS BIOBUOY FOR DETECTING A CHARACTERISTIC OF A MARINE BIOSPHERE AND METHOD OF ASSEMBLING THE BIOBUOY

STATEMENT REGARDING FEDERALLY SPONSORED RESEARCH OR DEVELOPMENT

The invention claimed herein may be manufactured and used by or for the Government of the United States of America for governmental purposes without payment of any royalties thereon or therefor. This application and any patent issuing thereon is assigned to the United States Government and is available for licensing for commercial purposes. No license is necessary when used for Governmental purposes. Licensing and technical inquiries may be directed to the Office of Patent Counsel, Space and Naval Warfare Systems Center, Code 20012, San Diego, Calif., 92152.

BACKGROUND OF THE EMBODIMENTS OF THE INVENTION

The embodiments of the autonomous biobuoy and method disclosed herein generally relate to assessing the environmental characteristics of a marine environment.

It is desirable to assess the environmental characteristics of a marine environment. For example, for health reasons, it is desirable to test for presence of toxins in bodies of water, such as lakes, streams, rivers and oceans. A possible technique for detecting presence of environmental toxins in water may beneficially use the phenomenon of bioluminescence.

Bioluminescence is light generated by a chemical reaction within an organism, such as a marine organism, wherein chemical energy is converted into light energy. The chemical that produces the light is luciferin, which the organism acquires by diet or by internal synthesis. A chemical known as luciferase catalyzes the oxidation of luciferin to produce the light.

Examples of marine organisms that evince bioluminescence include dinoflagellates and zooplankton. Dinoflagellate "blooms" (i.e., population congregations so dense that they discolor ocean water red or brown to form so-called "red tides") of these organisms have been observed to degrade water quality and produce toxins harmful to other marine organisms. Such toxins can even affect humans such as by paralytic shellfish poisoning. It is known that bioluminescence diminishes in the presence of toxic chemicals. However, a problem in the art is lack of a suitable device to sense bioluminescence as an aid in detecting toxins in water.

Moreover, it is desirable to study the phenomenon of bioluminescence over an extended time to determine how the size of populations of bioluminescent organisms varies over time. It is also desirable to determine how populations of bioluminescent organisms vary with respect to changes in water temperature and water clarity. While some oceanographic studies focused on the distribution of bioluminescence in the marine environment, there is still inadequate understanding of its seasonal characteristics. Prior art studies were limited in duration (e.g., usually less than one or two years with long intervals between sets of measurements) as well as in methods to quantify bioluminescence. Quantifying bioluminescence over time and with respect to water temperature and water clarity may assist in determining seasonal variation in levels of toxicity in the marine environment. Another problem in the art is lack of a suitable device to quantify marine bioluminescence over time and with respect to water temperature and clarity.

In addition, it is desirable conduct such extended duration studies unattended. The prior art appears to lack devices for extended duration study of bioluminescence in a marine environment independent of boats or aerial means (e.g., helicopter or airplane) that would otherwise remain tethered to the device for gathering data and supplying power to the device. Therefore, yet another problem in the art is lack of a suitable device to autonomously conduct extended duration marine studies of bioluminescence.

BRIEF SUMMARY OF EMBODIMENTS OF THE INVENTION

An autonomous biobuoy is provided for detecting a characteristic of a marine biosphere, comprising a detector assembly for detecting the characteristic of the marine biosphere, the detector assembly capable of generating a detector assembly output signal responsive to the characteristic detected thereby and a transmitter coupled to the detector assembly for broadcasting the detector assembly output signal.

Also, there is provided a method of assembling an autonomous biobuoy for detecting a characteristic of a marine biosphere, comprising the steps of providing a detector assembly for detecting the characteristic of the marine biosphere, the detector assembly capable of generating a detector assembly output signal responsive to the characteristic detected thereby and coupling a transmitter to the detector assembly for broadcasting the detector assembly output signal.

BRIEF DESCRIPTION OF THE SEVERAL VIEWS OF THE DRAWING(S)

While the specification concludes with claims particularly pointing-out and distinctly claiming the subject matter of the autonomous biobuoy and method, it is believed the autonomous biobuoy and method will be better understood from the following description when taken in conjunction with the accompanying drawings wherein:

Figure 10:
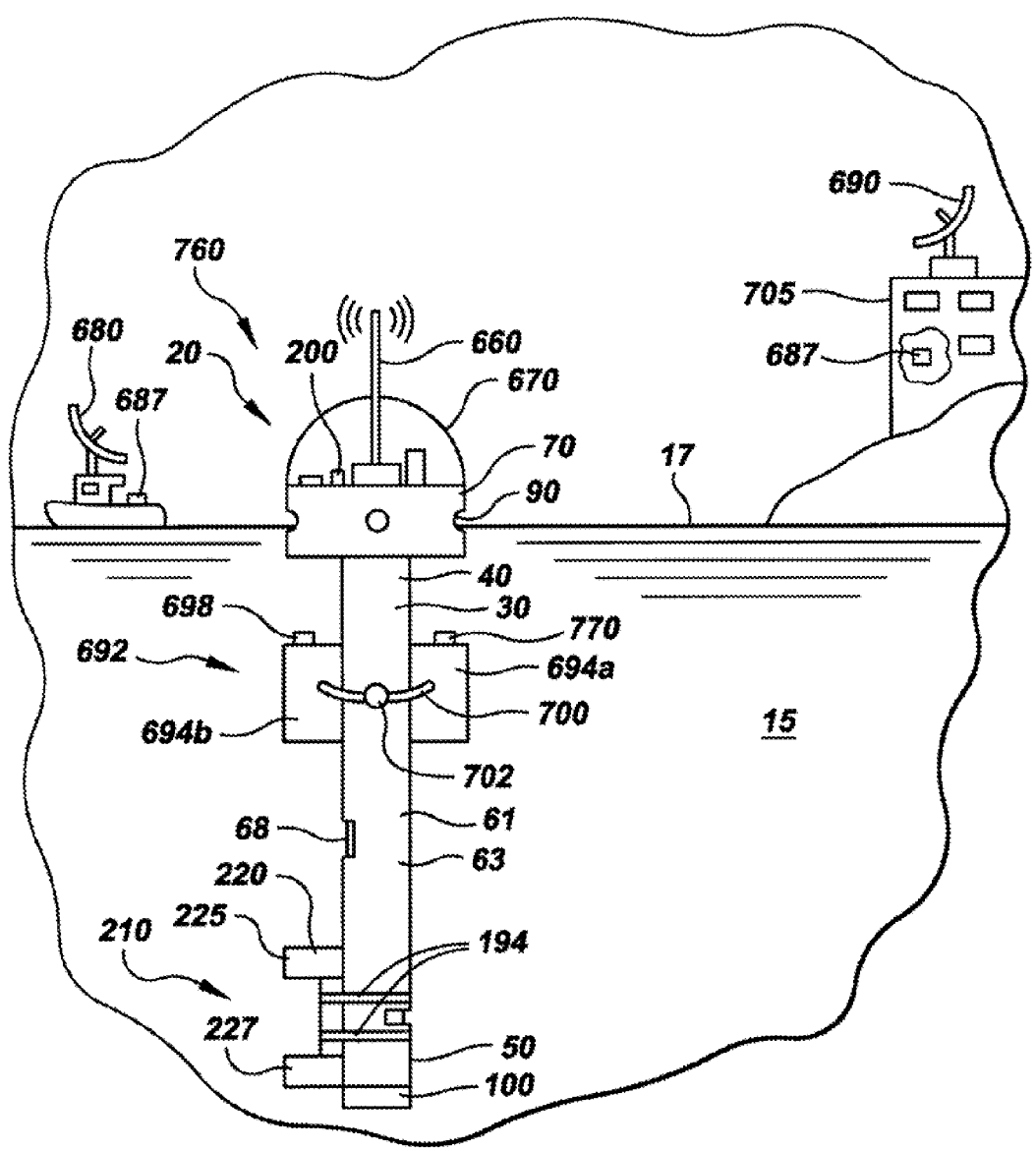
Figure 11:
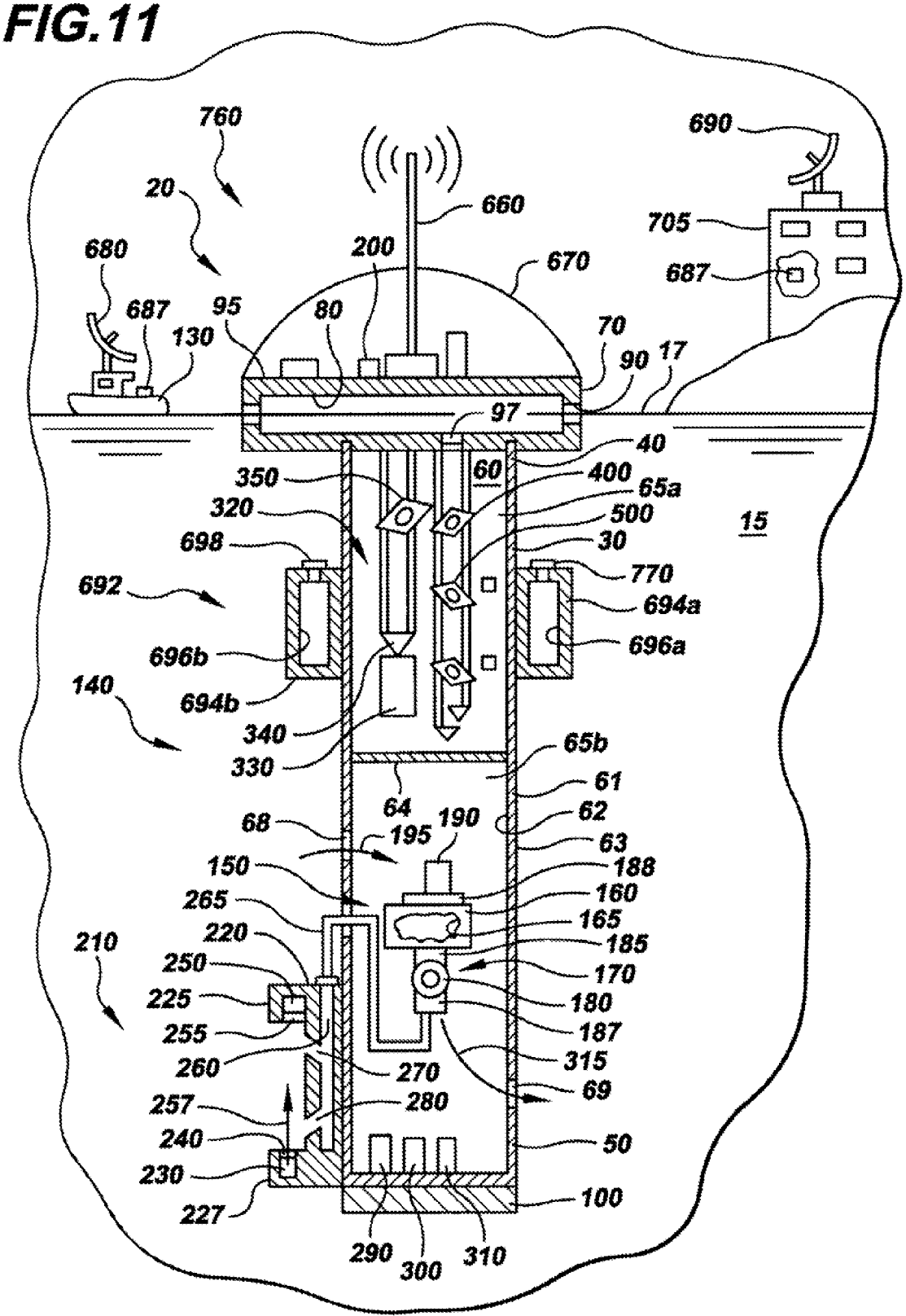
Figure 12:
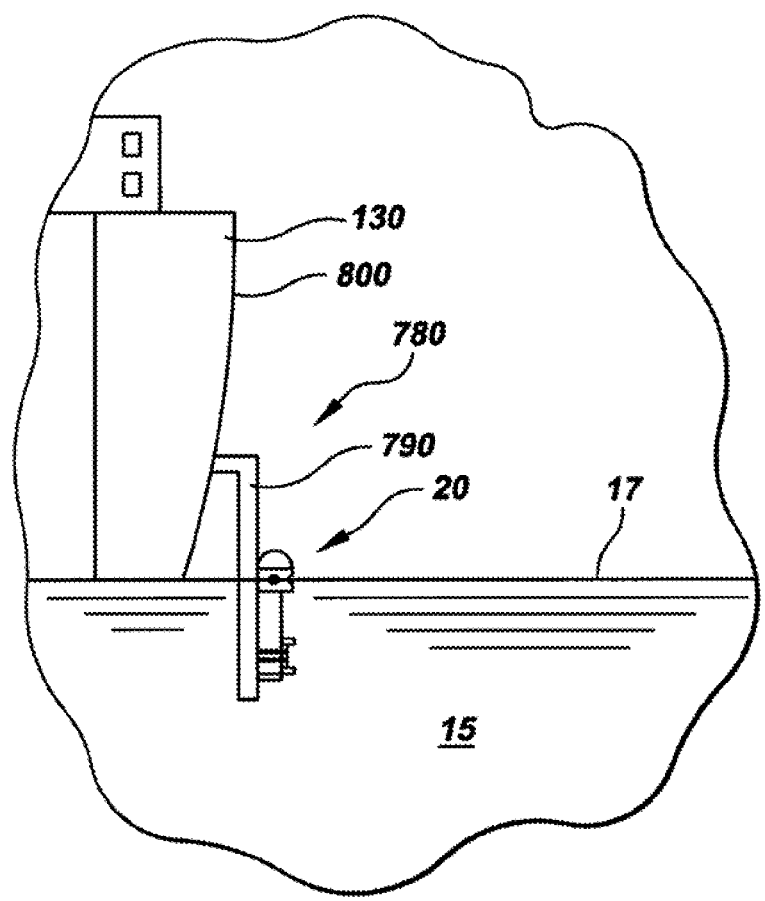

FIG. 10 a view in elevation of a third embodiment autonomous biobuoy, this view showing means for scuttling the autonomous biobuoy;

FIG. 11 is a view in partial vertical section of the third embodiment autonomous biobuoy; and FIG. 12 is a view in elevation of a fourth embodiment autonomous biobuoy, this view showing the fourth embodiment autonomous biobuoy removably connected to the hull of a sea-going vessel.

DETAILED DESCRIPTION OF REPRESENTATIVE EMBODIMENT(S) OF THE INVENTION

The representative embodiments of the autonomous biobuoy disclosed herein will be directed in particular to elements forming part of, or cooperating more directly with, an apparatus in accordance with the invention. It is to be understood that elements not specifically shown or described may take various forms well known to those skilled in the art.

Therefore, referring to FIGS. 1, 2, 3, 4 and 5, there is shown a first embodiment autonomous biobuoy, generally referred to as 10, for detecting a characteristic of a marine biosphere 15 having a surface 17. Biosphere 15 may have corrosive content, such as salt. With regard to reducing corrosive attack of biosphere 15 on biobuoy 10, the biobuoy 10 may be fabricated from a corrosion-resistant material such as aluminum, bronze, brass, stainless steel, titanium, or even a suitable ceramic or plastic. As defined herein, a "characteristic" may be bioluminescence in biosphere 15, temperature of biosphere 15, opaqueness of biosphere 15 or presence of a contaminant, such as petroleum, oil, or lubricant on surface 17. However, it will be understood that other characteristics may be detected as well. For example, pressure, salinity or other characteristic of interest may be detected by biobuoy 10 depending on the detectors selected for biobuoy 10.

Still referring to FIGS. 1, 2, 3 and 4, biobuoy 10 comprises a housing 20 that includes a tubular member 30. Tubular member 30 has a first end 40 and a second end 50. Also, tubular member 30 defines an interior 60, a wall 61, an interior surface 62 of wall 61 and an exterior surface 63 of wall 61. Disposed in interior 60 is a partition plate 64 integrally connected to interior surface 62 and extending therearound. Partition plate 64 partitions interior 60 into a first compartment 65a and a second compartment 65b. Compartment 65a is water-tight for reasons described hereinbelow. For reasons described hereinbelow, formed through tubular member 30, intermediate partition plate 64 and second end 50, is an intake port 68. It may be appreciated that tubular member 30 may take any convenient shape in transverse cross-section, such as circular, square, triangular, or other shape. In addition, for reasons described hereinbelow, formed through tubular member 30, intermediate intake port 68 and second end 50, is an outlet port 69. Mounted, such as by welding, on first end 40 of tubular member 30 is a hollow generally disk-shaped cap 70 defining a chamber 80 therein. Cap 70 serves as a flotation device for maintaining buoyancy of housing 20 in biosphere 15. In this regard, cap 70 may be made from a suitable material having a specific gravity less than 1000 kilograms/cubic meter. Therefore, the material of cap 70 may be selected from the group of materials consisting essentially of solid cork (specific gravity of 200 kilograms/cubic meter); wood (specific gravity of about 673 kilograms/cubic meter); or like materials having a specific gravity of less than 1000 kilograms/cubic meter. It is known that materials having a specific gravity of less than 1000 kilograms/cubic meter will float in water that has a specific gravity of 1000 kilograms/cubic meter. Formed through cap 70 and extending around the perimeter of cap 70 are a plurality of spaced-apart openings 90 for reasons described hereinbelow. In addition, cap 70 defines a platform 95 thereon and an optical window 97 therein for reasons described hereinbelow. Although it is contemplated that biobuoy 10 may be deployed in an ocean, it will be appreciated that biobuoy 10 may be deployed in lakes, bays or rivers to detect bioluminescent organisms therein and other characteristics (e.g., temperature or opaqueness) of the marine biosphere of interest.

Referring to FIGS. 2, 3, 4 and 5, attached to second end 50 of tubular member 30 is a weighted ballast member 100 for stabilizing housing 20 in marine biosphere 15, which may be a body of water having wave action tending to rock biobuoy 10 to-and-fro. Ballast member 100 is "weighted" in the sense that ballast member 100 has a specific gravity greater than biosphere 15 and is sized so that tubular member 30 will be stabilized but not sink in biosphere 15. With regard to enhancing stabilization, ballast member 100 lowers the center of gravity of housing 20 to improve the stabilization of housing 20, particularly when the previously mentioned to-and-fro rocking motion is pronounced. Improving stabilization may assist in obtaining more reliable or repeatable test results without the effect of the previously mentioned to-and-fro rocking motion. Biobuoy 10 may be deployed at biosphere 15 by any convenient means, such as by being jettisoned from a helicopter 110, an airplane 120 or a boat 130. Alternatively, biobuoy may be lowered into biosphere 15 from helicopter 110, airplane 120 or boat 130 by means of a wrench mechanism (not shown).

As previously mentioned, it is desirable to detect bioluminescence. For example, bioluminescence diminishes in the presence of toxic chemicals; therefore, the phenomenon of bioluminescence may be used as indicia of water quality. Further, it is useful to conduct basic research that studies the phenomenon of bioluminescence. For example, it may be desirable to study changes in bioluminescence over time and to study bioluminescence as a function of temperature, marine opaqueness and salinity. Hence, there is a need to detect bioluminescence for enhancing environmental water quality monitoring and for the purpose of marine research.

Therefore, as shown in FIGS. 2, 3, 4 and 5, disposed in interior 60 of tubular member 30 is a detector assembly, generally referred to as 140, for performing measurements of bioluminescence and other characteristics in biosphere 15. Detector assembly 140 comprises a light-sensitive bioluminescence detector assembly, generally referred to as 150. Light-sensitive bioluminescence detector assembly 150 is disposed in tubular member 30 between intake port 68 and outlet port 69 for detecting bioluminescence. Light sensitive detector assembly 150 comprises a test chamber 160 defining a light-tight or darkened cavity 165 therein for receipt of water in which bioluminescent marine organisms (not shown) may be suspended. In this regard, by way of example only, and not by way of limitation, cavity 165 may have a volume of about 25 milli liters. In communication with cavity 165 are an inlet opening (not shown) and an outlet opening (also not shown) for allowing ingress and egress of water into and out of cavity 165. In this regard, coupled to the outlet opening of cavity 165 is a pump assembly, generally referred to as 170, for suctioning the water through cavity 165. Pump assembly 170 comprises an electric pump 180 having a suction end 185 coupled to the outlet opening of cavity 165. Pump 180 is in fluid communication with the water in cavity 165 for suctioning the water through cavity 165. Pump 180 also has a discharge end 187 for reasons described hereinbelow. Disposed at the inlet opening of cavity 165 is a mesh filter 188 for filtering debris from the water entering cavity 165. Filtering debris from the water enhances accuracy, reliability and validity of test results obtained from cavity 165. Mounted atop filter 188 and in communication with cavity 165 is a light-sensitive detector, such as a photodetector 190, for sensing light emitted by bioluminescent marine organisms in cavity 165. In this regard, photodetector 180 may be a one-inch diameter photodetector tube available from Hamamatsu Photonics, K.K., located in Hamamatsu City, Japan.

Referring again to FIGS. 2, 3, 4 and 5, pump 180 suctions water, including any bioluminescent organisms therein, through intake port 68 and along first flow path 195. The water then flows through filter 188 and into cavity 165 for detection of bioluminescence that may be emitted therein. By way of example only, and not by way of limitation, pump 180 may suction water through cavity 165 at a constant rate, such as a constant flow rate of about 0.25 liters per second, so that test results do not vary due to a varying flow rate. A constant flow rate allows for easier data analysis. As the water enters cavity 165, any living and healthy bioluminescent organisms therein will emit light detectable by photodetector 190. It may be appreciated that bioluminescence of the marine organisms present in cavity 165 is caused either by the organisms impacting mesh filter 188 or by turbulent motion of the water passing through cavity 165. Turbulence associated with water mixing in cavity 165 stimulates bioluminescent plankton (i.e., single-cell dinoflagellates) to emit light within the darkened cavity 165. Also, as water is suctioned through cavity 165, small bioluminescent zooplankton may also be sampled and may also contribute to the overall bioluminescent signal. In response to any bioluminescence, photodetector 190 will then generate an output signal that travels to an electronics unit 200, such as by means of an electrical conduit (not shown), for purposes described more fully hereinbelow. Electronics unit 200 may be disposed on platform 95 that is defined by cap 70.

Biobuoy 10 is also capable of detecting water clarity or opaqueness in addition to bioluminescence. It is desirable to detect water clarity or opaqueness because detection of water clarity or opaqueness may, for example, indicate regions of biosphere 15 where plankton is concentrated. It is desirable to detect a decrease in water clarity or opaqueness because dense concentrations of plankton (e.g., "red tides") may decrease water quality. Identifying such ocean regions aids environmental research projects, such as investigating variation of plankton populations and their environmental impact over time.

Therefore, still referring to FIGS. 2, 3, 4 and 5, connected to exterior wall 64 of tubular member 30, such as by a plurality of bands 194, is a transmissometer assembly, generally referred to as 210 for detecting water clarity or opaqueness. Transmissometer assembly 210 is in fluid communication with biosphere 15 via port 68. Transmissometer assembly 210 comprises a generally elongate body 220 having a first leg portion 225 and a second leg portion 227 outwardly projecting therefrom. Mounted in second leg portion 227, but in optical communication with the water found exteriorly to tubular member 30, is an LED (Light Emitting Diode) 230. LED 230 is connected, by means well-known in the art, to electronics unit 200, such as by means of an electrical conduit (not shown) that conducts electrical power to LED 230. LED 230 is sealingly covered by a first window 240 for protecting LED 230 from corrosive attack of water and debris present in biosphere 15. By way of example only, and not by way of limitation, LED 230 may emit a monochromatic red light signal having a wavelength between approximately 620 nanometers and 690 nanometers. A contemplated wavelength is approximately 680 nanometers. An LED suitable for this purpose is available from Wet Labs, Incorporated located in Philomath, Oreg., U.S.A.

Referring again to FIGS. 2, 3, 4 and 5, transmissometer assembly 210 further comprises a transmissometer light detector 250 that is aligned with LED 230 and that is in optical communication therewith. Light detector 250 is sealingly covered by a second window 255 for protecting light detector 250 from corrosive attack of water and debris present in biosphere 15. The amount of light from LED 230 that is detected by light detector 250 is attenuated by the amount of clarity or opaqueness therebetween and therefore indicates water clarity or opaqueness of biosphere 15. Light emitted by LED 230 will follow a light path 257 to reach light detector 250. Light detector 250 generates a light detector output signal which is conducted by an electrical conduit (not shown) to electronics unit 200 for reasons provided hereinbelow. Moreover, body 220 defines a hollow portion 260 therein that is in fluid communication with the previously mentioned outlet end 187 of pump 180. Hollow portion may be in fluid communication with outlet end 187 of pump 180 by means of a tube 265. Formed in body 220 and in communication with hollow portion 260 is a first channel 280 angled to align with first window 240. Also formed in body 220 and in communication with hollow portion 260 is a second channel 270 angled to align with second window 255. In this regard, it may be understood from the description immediately hereinabove that as pump 180 suctions water through cavity 165 and into hollow portion 260, the water will flow through first channel 280 and second channel 270 to impinge first window 240 and second window 255, respectively. It may be appreciated that as water flows through first channel 280 and second channel 270, the water will simultaneously flow out suction end 185 of pump 180 and exit outlet port 69. As the water impinges first window 240 and second window 255, the water will tend to wash windows 240 and 255 clear of corrosive particles and debris. Thus, channels 270 and 280 in combination with pump 180 function to automatically wash windows 240 and 255. It is important to wash windows 240 and 255, so that windows 240 and 255 are free of corrosive particles and debris that might otherwise block transmission of light from LED 230 or receipt of light by light detector 250. In other words, it is important that the light signal 257 emitted by LED 230 is received by light detector 250, in order to measure clarity of water residing between LED 230 and light detector 250. Presence of corrosive particles and debris on either first window 240 or second window 255 interferes with such measurements.

Again referring to FIGS. 2, 3, 4 and 5, a temperature thermister 290 is disposed in second compartment 65b of tubular member 30, and is in fluid communication with biosphere 15 via intake port 68, for measuring temperature in biosphere 15 by measuring the water temperature within second compartment 65b. Also disposed in second compartment 65b and in fluid communication with biosphere 15 via intake port 68 is a conductivity (i.e., salinity) detector 300 for measuring electrical conductivity (i.e., salinity) of the biosphere 15 by measuring electrical conductivity of the water within second compartment 65b. Further, disposed in second compartment 65b, and in fluid communication with biosphere 15 via intake port 68, is a depth detector 310 for measuring depth of housing 20 in biosphere 15 by measuring water pressure or hydraulic head in second compartment 65b. In this manner, light-sensitive detector assembly 150, thermister 290, conductivity detector 300 and depth detector 310 determine a plurality of characteristics of biosphere 15 as these components take measurements in biosphere 15. Moreover, each of light-sensitive detector assembly 150, thermister 290, conductivity detector 300 and depth detector 310 is connected to electronics unit 200 by means well known in the art, such as by respective ones of a plurality of electrical conduits (not shown), for reasons described hereinbelow. Such data signals received by electronics unit 200 are transformed by electronics unit 200 into data signals appropriate for radio frequency transmission.

Still referring to FIGS. 2, 3, 4 and 5, it may be appreciated from the description hereinabove that, as pump 180 operates, water is suctioned through intake port 68 and along flow path 195. The water then flows through mesh filter 188 which blocks debris, but not desired bioluminescent organisms, from entering cavity 165. As the water flows from cavity 165 and through pump 180, a first portion of the water enters hollow portion 260 of body 220 and a second portion exits outlet port 69. As the water enters hollow portion 260, the water flows through first channel 270 and second channel 280. As previously mentioned, water flowing through first channel 270 and second channel 280 impinges first window 240 and second window 255 for washing windows 240 and 255, so that windows 240 and 255 are debris-free. Moreover, as water washes windows 240 and 255, the water flows toward outlet port 69 and then exits therethrough generally along second flow path 315. Also, it may be appreciated that, as housing 20 is deployed in the lake, stream, river or ocean, second compartment 65b fills with water that enters through intake port 68. In this manner, cavity 165, pump 180, LED 230, light-sensitive light detector 250, thermister 270, conductivity detector 300 and depth detector 310 are immersed in water from biosphere 15, due to water entering through intake port 68. These components are immersed in water for obtaining proper measurements of characteristics in biosphere 15.

Figure 5:
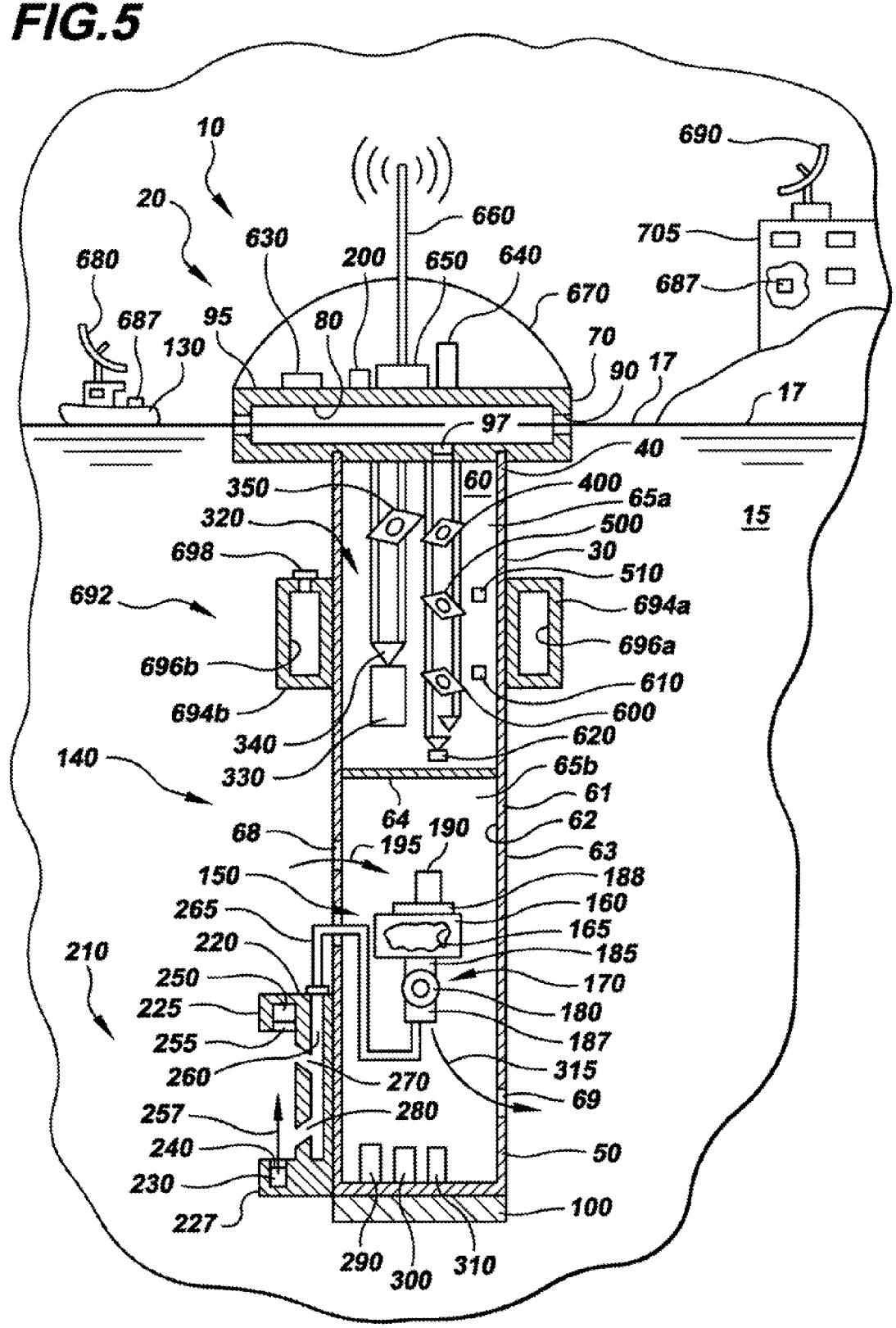
FIG. 5 is a view in partial vertical section of the first embodiment autonomous biobuoy, this view showing a test assembly disposed in a tubular member belonging to the first embodiment autonomous biobuoy.
Figure 6:
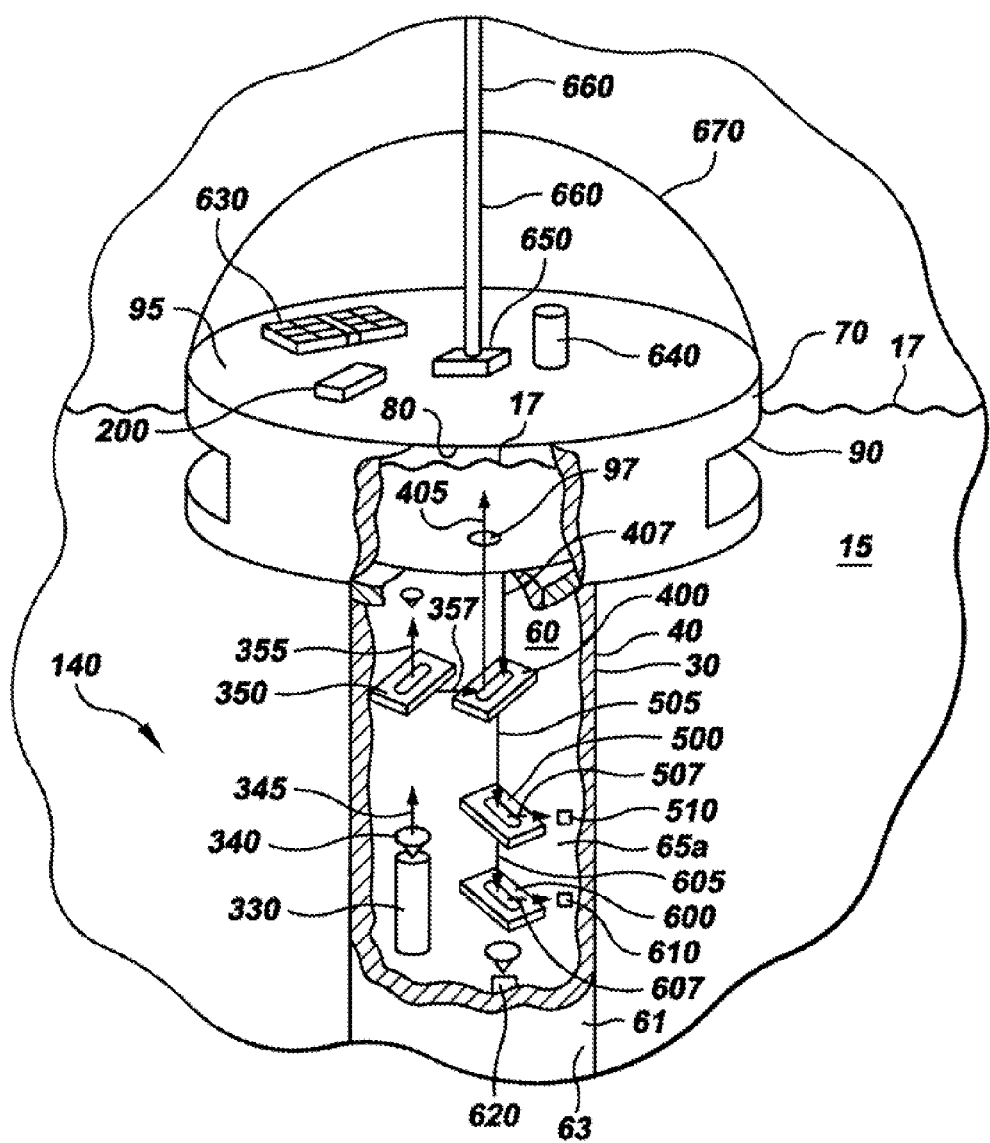
FIG. 6 is a perspective view in partial vertical section, with parts removed for clarity, of the first embodiment autonomous biobuoy, this view showing a POL (Petroleum, Oil, Lubricant) detector disposed in the tubular member.

Referring to FIGS. 5 and 6, first embodiment biobuoy 10 further comprises a POL (Petroleum, Oil and Lubricant) detector assembly, generally referred to as 320, for detecting petroleum, oil and lubricant contaminants tending to float near or on surface 17 of biosphere 15. POL detector assembly 320 comprises a source of illumination, such as a lamp 330, for reasons provided hereinbelow. Lamp 330 is connected to electronics unit 200, such as by a wire (not shown) for controlling operation of lamp 330. A light beam from lamp 330 passes through a collimating lens 340 along a first light path 345, which collimating lens 340 is aligned with lamp 330. Collimating lens 340 reduces divergence of the light beam, so that light rays from lamp 330 remain parallel. The collimated light beam is received by a first dichroic mirror 190 aligned with collimating lens 340. First dichroic mirror 350 reflects the light in the light beam selectively according to wavelengths present in the light beam. In other words, depending on the wave lengths in the light beam, first dichroic mirror 350 splits the light beam into a second light path 355 and a third light path 357. The second light path 355 travels straight through first dichroic mirror 350, while third light path 357 is reflected at a right angle to second light path 355. Third light path 357 is received by a second dichroic mirror 400. As third light path 357 is received by second dichroic mirror 400, the light beam is reflected at a right angle along a fourth light path 405 and through previously mentioned optical window 97, which is aligned with second dichroic mirror 400. As the light beam passes through optical window 97, the light beam will illuminate water in chamber 80 that is defined by cap 70. Light that enters chamber 80 is back-scattered or reflected by particles present in the water in chamber 80. Such particles may be present as the result of petroleum, oil or lubricants near or on surface 17 of biosphere 15. Some of this back-scattered or reflected light passes through optical window 97 along fifth light path 407, whereupon the light is received by second dichroic mirror 400 and passes therethrough. The light beam passing through optical window 97 contains a plurality of wave lengths.

Still referring to FIGS. 5 and 6, the light passing through second dichroic mirror 400 along light path 407 is received by a third dichroic mirror 500, which is aligned with second dichroic mirror 400. The light received by third dichroic mirror 500 is split into two light beams according to the wave lengths of the light that reflected back through optical window 97 along fifth light path 407. A first one of these light beams passes along sixth light path 505 and through third dichroic mirror 500 while a second one of these light beams is reflected at a right angle along seventh light path 507. The light traveling along seventh light path 507 is received by a first photo detector channel 510 for detecting a first one of the wavelengths in the light beam originating from optical window 97. Light traveling along sixth light path 505 that passes through third dichroic mirror 500 is received by a fourth dichroic mirror 600. The light received by fourth dichroic mirror 600 is also split into two light beams. A first one of these light beams passes through fourth dichroic mirror 600 along an eighth light path 605 while a second one of these light beams is reflected at a right angle along a ninth light path 607. The light traveling along ninth light path 607 is received by a second photodetector channel 610 for detecting a second one of the wavelengths in the light beam originating from optical window 97. Light that travels along eighth light path 605 and that passes through fourth dichroic mirror 600 is received by a third photo detector channel 620 for detecting a third one of the wavelengths in the light beam originating from optical window 97. Data from photodetector channels 510, 610 and 620 may indicate types of petroleum, oil and lubricants that may be present near or on surface 17 of biosphere 15.

Referring again to FIGS. 5 and 6, it may be understood that second dichroic mirror 400, third dichroic mirror 500 and fourth dichroic mirror 600 separate the light from optical window 97 into three spectral bands or wavelengths. These spectral bands may be subjected to multispectral analysis to discriminate between different contaminants located near or on surface 17. The three separate wavelengths of light reflected by second dichroic mirror 400, third dichroic mirror 500 and fourth dichroic mirror 600 are detected by first photodetector channel 510, second photodetector channel 610 and third photodetector channel 620, respectively. Each of first photodetector channel 510, second photodetector channel 610 and third photodetector channel 620 are connected to electronics unit 200 by means well known in the art, such as by means of electrical conduits (not shown), for reasons described more fully hereinbelow. Also, it may be appreciated that first compartment 65a is water-tight to avoid water that enters intake port 68 from coming into contact with POL detector assembly 320. Avoiding such contact allows detector assembly 320 to specifically test for presence of petroleum, oil or lubricants near or on surface 17 of biosphere 15.

Figure 1:
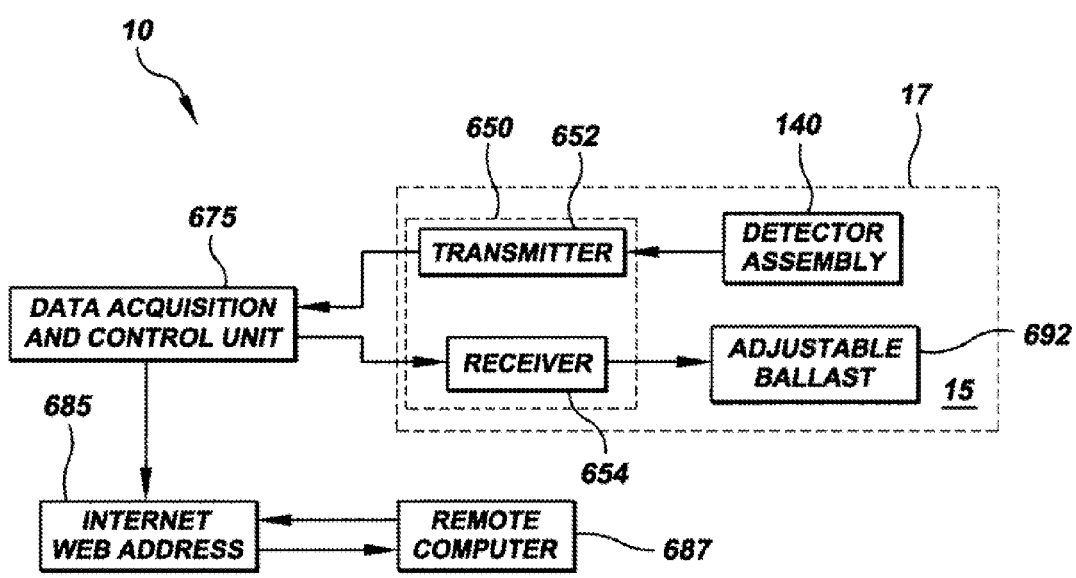
FIG. 1 shows a functional block diagram of a first embodiment autonomous biobuoy.

As best seen in FIG. 6, disposed on platform 95 of cap 70 is a solar panel 630 for powering detector assembly 140, electronics unit 200, transmissometer assembly 210, first photodetector channel 510, second photodetector channel 610, thermister 290, conductivity detector 300, depth detector 310, POL detector assembly 320, lamp 330, and third photodetector channel 620. Solar panel 630 is also connected to a GPS (Global Positioning System) unit 640 for powering GPS unit 640. GPS unit 640, which is disposed on platform 95, provides means for identifying the location of housing 20 once housing 20 is disposed in biosphere 15. Each of the components mentioned immediately hereinabove generates an electrical output signal that is received by electronics unit 200. As previously mentioned, such data signals received by electronics unit 200 are transformed by electronics unit 200 into data signals appropriate for radio frequency transmission. In this regard, a first radio frequency transmitter-receiver 650 is disposed on platform 95 and is connected to electronics unit 200 by means well known in the art, such as by an electrical cable. Radio frequency transmitter-receiver 650 comprises a transmitter 652 and a receiver 654, as shown in FIG. 1. Radio frequency transmitter-receiver 650 is also connected to solar panel 630 for powering radio frequency transmitter-receiver 650. Radio frequency transmitter-receiver 650 is capable of receiving the output signal from electronics unit 200 that in turn receives the output signals from detector assembly 140, transmissometer assembly 210, first photodetector channel 510, second photodetector channel 610, thermister 290, conductivity detector 300, depth detector 310, POL detector assembly 320, lamp 330, third photodetector channel 620 and GPS unit 640. Transmitter-receiver 650 broadcasts the output signals received from electronics unit 200 through an antenna 660 connected to transmitter-receiver 650. In addition, a transparent or translucent dome 670 is sealingly mounted on platform 95, so as to enclose solar panel 630, electronics unit 200, GPS unit 640 and transmitter-receiver 650. Dome 670 is transparent so that these components are available for visual inspection before deployment or after retrieval of housing 20 from biosphere 15. In this regard, dome 670 may be made of clear plastic material. Enclosing these components within dome 670 shields or protects these components from debris damage by or the corrosive effects (e.g., due to salt) of biosphere 15.

Referring to FIGS. 1, 5, and 6, the signal broadcast through antenna 660 may be received by a data acquisition and control unit 675, which may be a first radio frequency receiver-transmitter 680 disposed aboard boat 130, helicopter 110 or airplane 120. First radio frequency receiver-transmitter 680 may, in turn, broadcast the signal to an Internet web address 685 for retrieval by a remote computer 687 having authorized access to the web address 685. Alternatively, the signal broadcast through antenna 660 may be received by a second radio frequency receiver-transmitter 690 disposed in a land-based facility 705. Remote computer 687 may be disposed on boat 130, helicopter 110, airplane 120 or land-based facility 705.

Figure 2:
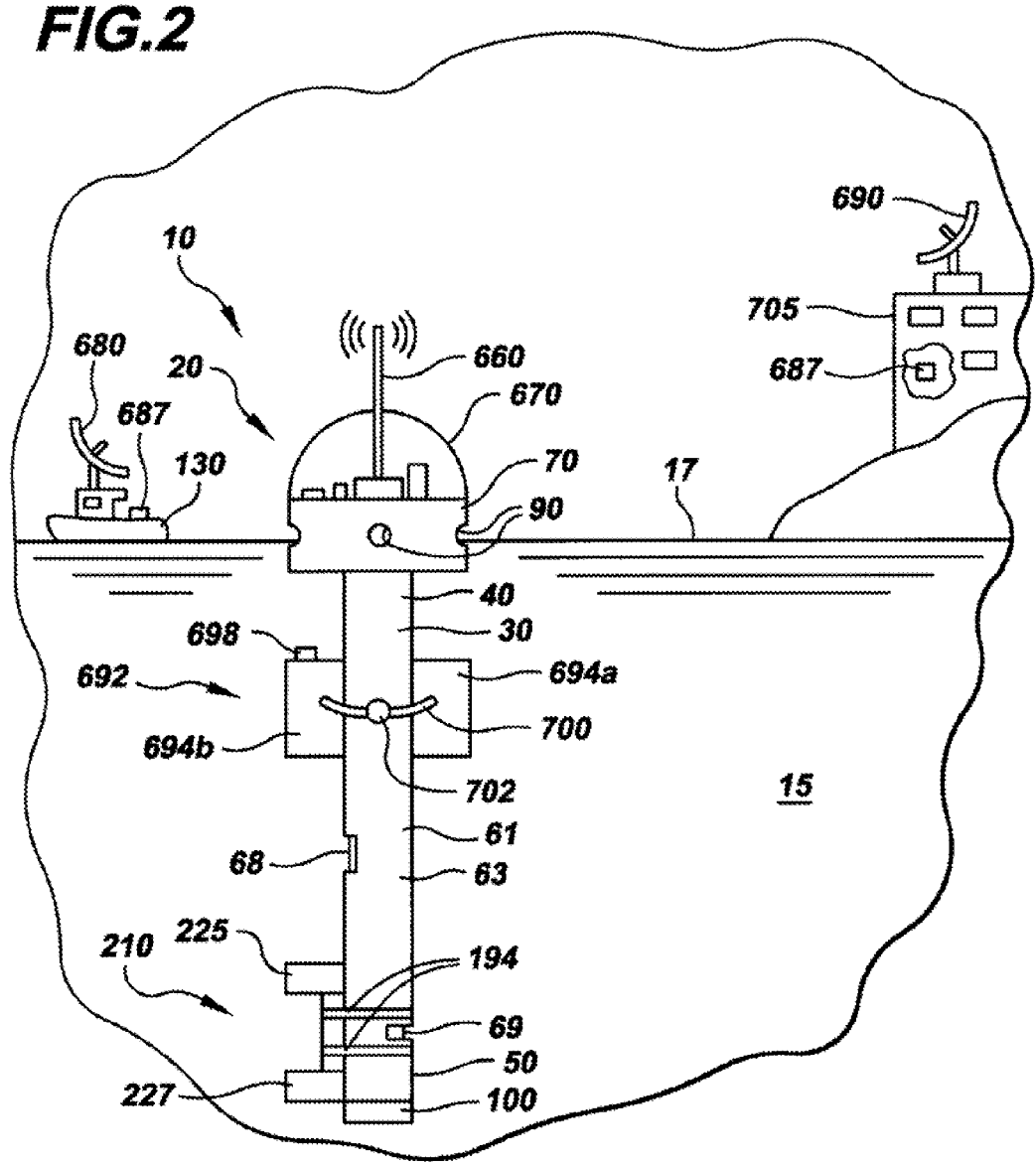
FIG. 2 is a view in elevation of the first embodiment autonomous biobuoy, this view showing deployment of the first embodiment autonomous biobuoy by means of a boat.
Figure 3:
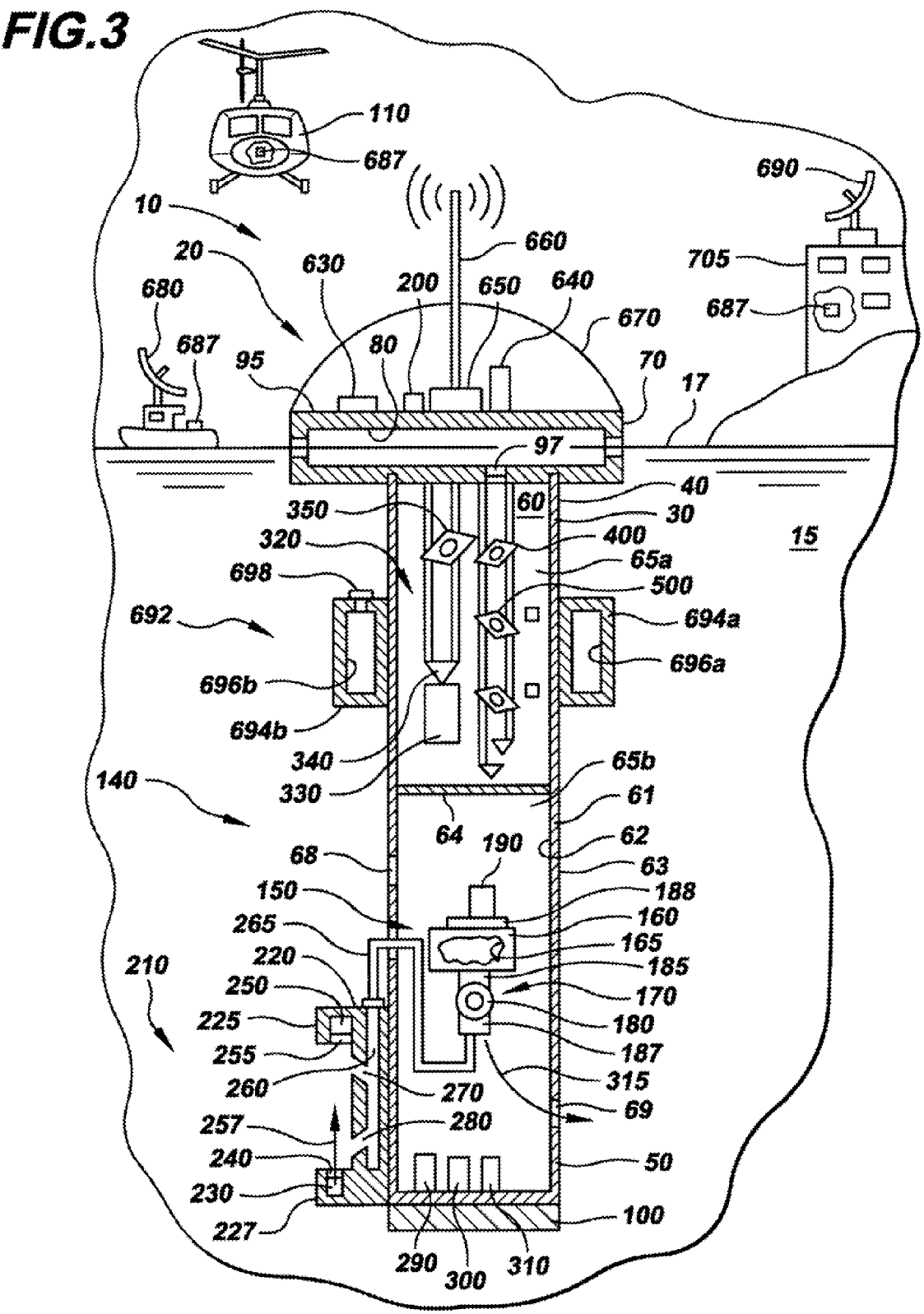
FIG. 3 is a view of the first embodiment autonomous biobuoy, this view showing deployment of the first embodiment autonomous biobuoy by means of a helicopter.
Figure 4:
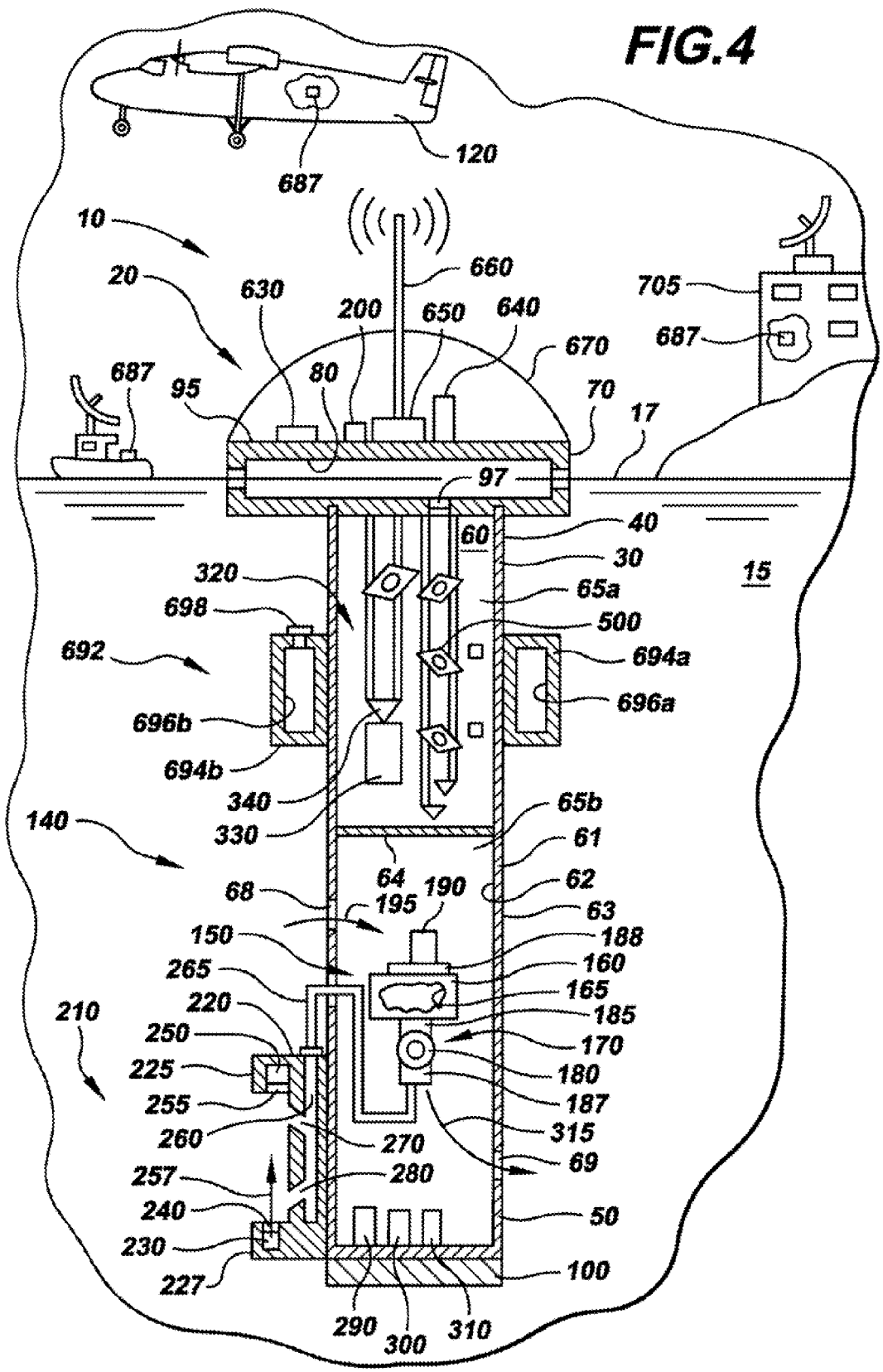
FIG. 4 is a view of the first embodiment autonomous biobuoy, this view showing deployment of the first embodiment autonomous biobuoy by means of an airplane.

Referring to FIGS. 1, 2 and 3, an adjustable ballast, generally referred to as 692, is provided for causing housing 20 to controllably, vertically descend and ascend in biosphere 15. Adjustable ballast 692 thereby controls buoyancy of biobuoy 10 while disposed in biosphere 15. Adjustable ballast 692 comprises a first ballast tank 694a coupled to outer wall 63 of tubular member 30. First ballast tank 694a defines a leak-tight first chamber 696a therein. Also coupled to outer wall 63 of tubular member 30 is a second ballast tank 694b. Second ballast tank 694b also defines a leak-tight second chamber 696b therein and includes an electrically operable valve, such as a two-way valve 698, in communication with second chamber 696b. Interconnecting first chamber 696a and second chamber 696b is a conduit 700 having an electrically operable flow valve 702 disposed therein, for reasons disclosed immediately hereinbelow.

Still referring to FIGS. 1, 2 and 3, prior to deployment of biobuoy 10, first chamber 696a is filled with a predetermined amount of pressurized gas, such as air. During deployment of biobuoy 10 in biosphere 15, housing 20 may be caused, if desired, to vertically descend to a predetermined depth in biosphere 15 for testing characteristics (e.g., presence of bioluminescent organisms) of biosphere 15 at that predetermined depth. When deployed in biosphere 15, housing 20 will tend to float due to buoyancy of cap 70 which as a specific gravity less than specific gravity of biosphere 15. When desired, housing 20 may be caused to sink in biosphere 15 to measure characteristics at predetermined depths of biosphere 15. In this regard, valve 698 may be opened to allow water to enter second tank 694b, thereby decreasing buoyancy of housing 20. The relatively dense gas in first ballast tank 694a in combination with the presence of ballast member 100. However, the amount of descent of housing 20 is controlled by operating flow valve 702, which causes a metered release of gas from first ballast tank 694a, through conduit 700 and into second ballast tank 694b. As the gas enters empty second ballast tank 694a, the gas will tend to expand to add buoyancy to housing 20 to slow or stop vertical descent of housing 20 into biosphere 15. Valve 698 may be operated during this time for releasing the gas in second ballast tank 694b. Release of gas in second ballast tank 694b adds further buoyancy that will cause housing 20 to vertically rise in biosphere 15. Operation of adjustable ballast 692 is controlled by electronics unit 200. After housing 20 resurfaces at surface 17, transmitter-receiver 650 will transmit the test data to data acquisition and control unit 675. Adjustable ballast 692 is connected to electronics unit 200 by means well known in the art, such as by electrical wires or cables (not shown). Moreover, cap 70 has a specific gravity less than 1000 kilograms/cubic meter and therefore adds even more buoyancy to housing 20.

Figure 7:
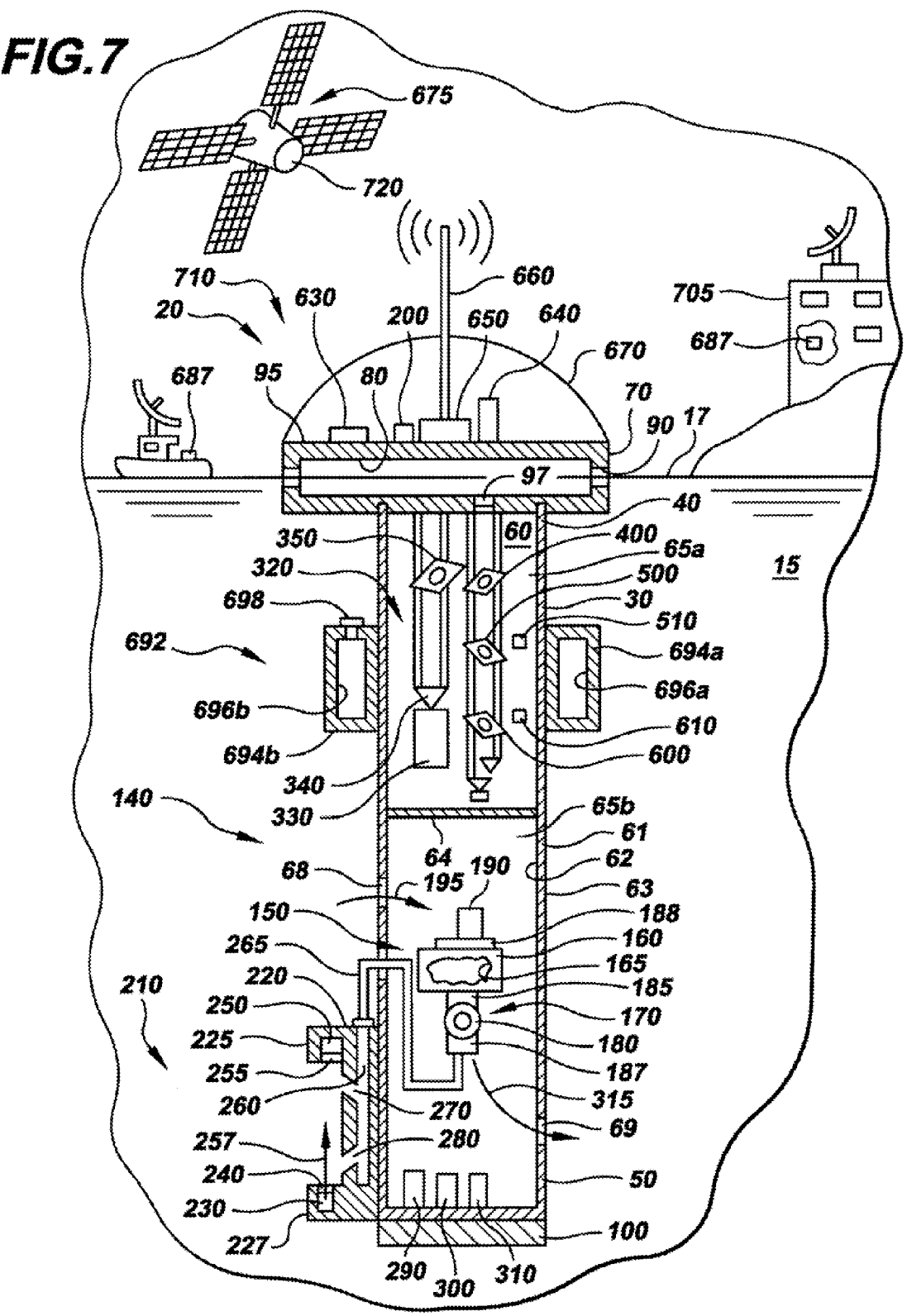
FIG. 7 is a view in partial vertical section of a second embodiment autonomous biobuoy, this view showing the autonomous biobuoy in communication with a satellite.

Turning to FIG. 7, there is shown a second embodiment autonomous biobuoy, generally referred to as 710, for detecting a characteristic of marine biosphere 15. According to this embodiment of the autonomous biobuoy, the signal broadcast trough antenna 660 is received by an overhead satellite 720. Overhead satellite 720, in turn, relays the data signal to Internet web address 685 for retrieval and further analysis by remote computer 687. Satellite 720 may be selected so that it is in near polar orbit, sun synchronous orbit or geosynchronous orbit, as required by the geographic location of housing 20.

Figure 8:
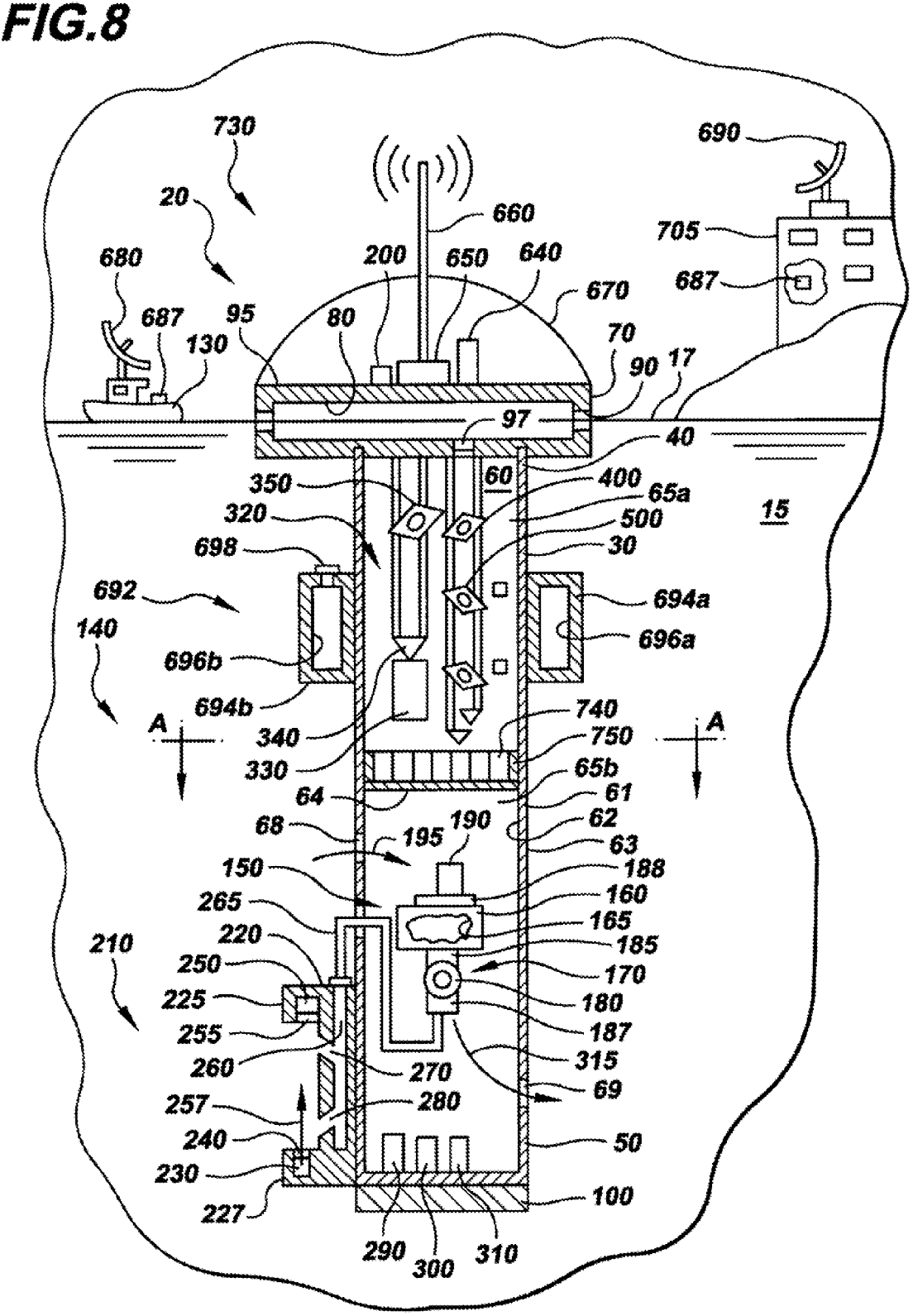
FIG. 8 is a view in partial vertical section of a third embodiment autonomous biobuoy, this view showing a battery belt disposed in the tubular member for powering the biobuoy.
Figure 9:
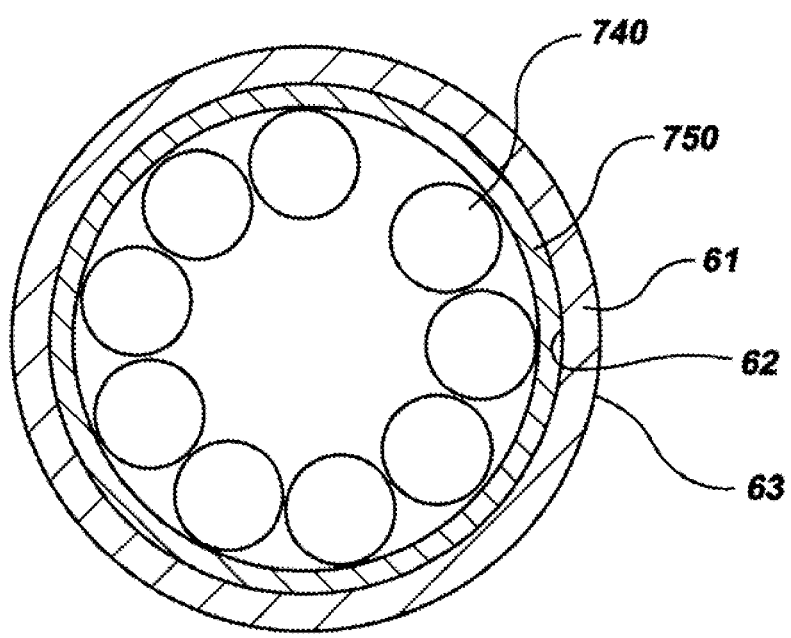
FIG. 9 is a view along section A-A of FIG. 8.

Referring to FIGS. 8 and 9, there is shown a third embodiment autonomous biobuoy, generally referred to as 730, for detecting a characteristic of marine biosphere 15. According to this third embodiment biobuoy 730, disposed in water-tight first compartment 65a of tubular member 30 may be a battery arrangement comprising a plurality of batteries 740 coupled to interior surface 62 of tubular member 30. Batteries 740 are connected to detector assembly 140, electronics unit 200, transmissometer assembly 210, first photodetector channel 510, second photodetector channel 610, thermister 290, conductivity detector 300, depth detector 310, POL detector assembly 320, lamp 330, third photodetector channel 620 and GPS unit 640 for supplying power to these components. In this regard, each of batteries 740 may reside in respective ones of a plurality of pockets (not shown) defined by a battery belt 750 that is connected to interior surface 62. Batteries 740 allow operation of third embodiment biobuoy 730 without need for solar panel 630 that would otherwise power components of biobuoy 730. This third embodiment biobuoy may be particularly beneficial when used in a region where sunlight is absent or nearly absent for extended periods of time, such as regions of northern Europe (e.g., Finland) during winter or the North Pole after the September Equinox. Thus, this third embodiment provides a convenient means for operating biobuoy 730 without use of solar panel 630. In addition, it may be appreciated from the description hereinabove that batteries 740 do not provide alternating current (AC). Hence, batteries 740 may be rechargeable, if desired, because batteries 740 do not provide AC power. Rather, batteries 740 provide direct current (DC) power.

Turning now to FIGS. 10 and 11, there is shown a fourth embodiment autonomous biobuoy, generally referred to as 760, for detecting a characteristic of marine biosphere 15. According to this fourth embodiment biobuoy 760, a scuttling valve 770 is provided for scuttling fourth embodiment biobuoy 760. Valve 770 is in communication with first chamber 696a, so that as valve 770 is opened, water from biosphere 15 will enter first chamber 696a. Also, two-way valve 698 is opened in a manner that allows water from biosphere 15 to enter second chamber 696b. The added mass provided by water in first chamber 696a and second chamber 697b will cause housing 20 to sink in biosphere 15. Valves 698 and 770 are connected to electronics unit 200, which controls operation of valves 698 and 770. In addition, presence of ballast 100 aids in causing housing 20 to sink into biosphere 15. In this manner, ballast 100 serves a dual purpose. First, as previously mentioned, ballast 100 assists in stabilizing motion of housing 20 in biosphere 15. Secondly, ballast 100 assists in scuttling housing 20.

It may be appreciated from the description hereinabove that first embodiment 10, second embodiment 710, third embodiment 730 and fourth embodiment 760 of the biobuoy are capable of operating autonomously. These embodiments of the biobuoy operate autonomously in the sense that there is an on-board power source (i.e., solar panel 630 or batteries 740), rather than an external powered source (e.g., electrical cable connected to a boat having a power source). Also, these embodiments of the biobuoy transmit detection data and receive operating instructions by means of radio frequency transmission, rather than by means of a data transmission cable. Thus, these embodiments of the biobuoy need not be tethered, such as by a cable, to an external power source or data transmission means. In other words, these embodiments of the biobuoy need not be tethered, such as by means of power cable or a data transmission cable, to a boat, aerial vehicle or land-based facility in order to obtain power or to receive and transmit detector data. For example, these embodiments of the biobuoy may float with ocean currents for extended periods of time while detecting and transmitting characteristics of the ocean environment.

Referring to FIG. 12, there is shown a fifth embodiment autonomous biobuoy, generally referred to as 780, for detecting a characteristic of marine biosphere 15. According to this fifth embodiment biobuoy 780, housing 20 is attached, such as by a bracket 790, to a hull 800 belonging to boat 130. This fifth embodiment biobuoy provides an alternative means for detecting characteristics of biosphere 15 and transmitting those characteristics by radio frequency transmission. In this sense, biobuoy 780 is autonomous because power supply and data transmission are by radio frequency transmission rather than by tethered cable.

It may be appreciated from the description hereinabove that detector assembly 140 detects characteristics of biosphere 15 and provides that data to transmitter 652 (via electronics unit 200). Transmitter 652 in turn transmits that data by radio frequency transmission to data acquisition and control unit 675. The data acquisition control unit makes the data available to an internet web address 685 by means of radio frequency transmission, where a remote computer 687 may access the data. In addition, remote computer 687 may send operational instructions to biobuoy by sending the instructions to internet web address 685 where data acquisition and control unit may access the instructions. Data acquisition and control unit 675 may then transmit a signal to receiver 654 for operating adjustable ballast 692 in the manner disclosed hereinabove.

By way of example only, and not by way of limitation, during operation of first embodiment 10, second embodiment 710, third embodiment 730, fourth embodiment 760 and fifth embodiment 780 of the biobuoy, light-sensitive detector 190 is powered-up for about four seconds before pump 180 is activated for about 10 seconds. During the 10 second sampling period, bioluminescence is quantified and averaged. As pump 180 is deactivated, percent transmission of water clarity is measured. The raw data are then sent, via radio frequency transmission, to receiver-transmitters 680 or 690. The data are then processed automatically and can be posted to real-time web address 685 via satellite link, if desired.

While the invention has been described with particular reference to its representative embodiments, it will be understood by those skilled in the art that various changes may be made and equivalents may be substituted for elements of the representative embodiments without departing from the invention. For example, a suitable camera may be mounted on tubular member 30 for visually recording events near or in the biosphere, such as presence of objects that may be stimulating bioluminescent activity. As yet another example, any of the various embodiments of the biobuoy described herein may be tethered to deployment vessel 130 or helicopter 110 or airplane 120 which would deploy the biobuoy in biosphere 15 and maintain it at a predetermined location within biosphere 15. As a further example, photodiodes may be used rather than photodetectors in order to lower cost of assembly and to make the biobuoy expendable (e.g., by scuttling the biobuoy) with less cost impact.

Therefore, what is provided is an autonomous biobuoy for detecting a characteristic of a marine biosphere and method of assembling the biobuoy.

What is claimed is:

1. An autonomous biobuoy for detecting characteristics of a marine biosphere, comprising:
   a housing comprising a dry water-tight compartment and a second compartment, wherein the second compartment is in fluid communication with the marine biosphere;
   a cap mounted to the top of the water-tight compartment, wherein the cap comprises a hollow chamber having an optical window into the water-tight compartment and at least one opening, wherein the opening is configured such that the chamber is in fluid communication with the marine biosphere;
   a detector assembly mounted to the housing, wherein the detector assembly comprises an electronics unit and the following sensors: a petroleum, oil and lubricant (POL) detector, a bioluminescence detector, a thermister, a transmissometer, a conductivity detector, a salinity detector, a global positioning system (GPS) unit, and a depth detector, each sensor configured to generate an output, and wherein the electronics unit is configured to transform the outputs of each of the sensors into a detector assembly output signal; and
   a transmitter-receiver mounted on top of the cap and operatively coupled to the electronics unit of the detector assembly, wherein the transmitter-receiver is configured to transmit the detector assembly output signal.

2. The autonomous biobuoy of claim 1, further comprising an on-board power supply operatively coupled to the detector assembly for powering the detector assembly.

3. The autonomous biobuoy of claim 1, further comprising an adjustable ballast coupled to the housing for controlling movement of the housing in the biosphere.

4. The autonomous biobuoy of claim 2, wherein said the on-board power supply comprises a solar panel mounted atop the cap and operatively coupled to the detector assembly for powering the detector assembly.

5. The autonomous biobuoy of claim 4, wherein the on-board power supply further comprises a battery operatively coupled to the detector assembly for powering the detector assembly.

6. The autonomous biobuoy of claim 5, wherein the transmitter-receiver, the GPS unit and the solar panel are enclosed in a transparent protective covering that protrudes from the surface of the marine biosphere.

7. The autonomous biobuoy of claim 3, wherein the adjustable ballast adjusts the depth of the housing in the biosphere.

8. The autonomous biobuoy of claim 7, wherein the adjustable ballast is a gas operable adjustable ballast.

9. The autonomous biobuoy of claim 8, wherein the adjustable ballast comprises:
 a first tank adapted to contain pressurized gas therein;
 a second tank adapted to receive the pressurized gas from the first tank;
 a conduit interconnecting the first tank and the second tank for conducting the gas from the first tank to the second tank;
 a flow valve coupled to the conduit for controlling flow of the gas through the conduit from the first tank to the second tank; and
 a scuttling valve coupled to the first tank.

10. The autonomous biobuoy of claim 9, wherein the adjustable ballast is controlled by the electronics unit.

11. The autonomous biobuoy of claim 10, wherein the electronics unit is configured to open the scuttling valve and the flow valve upon receiving, via the transmitter-receiver, a scuttling command from a remote user thereby scuttling the autonomous biobuoy.

12. The autonomous biobuoy of claim 1, wherein the transmitter-receiver is configured to broadcast the output signal to a satellite.

13. The autonomous biobuoy of claim 1, wherein the transmitter-receiver is configured to broadcast the output signal to a remote computer that is configured to automatically upload the outputs of the constituent sensors to an Internet website.

14. The autonomous biobuoy of claim 1, wherein the opening in the cap is aligned with a surface of the marine biosphere such that the surface water of the marine biosphere is allowed to enter the hollow chamber, and wherein the POL is mounted within the water-tight compartment and wherein the POL comprises:
 an illumination source operatively coupled to the electronics unit wherein the illumination source is configured to generate a first light beam;
 a collimating lens disposed to transform the first light beam into a collimated beam;
 a first dichroic mirror, aligned in the path of the collimated beam and disposed to reflect a portion of the collimated beam, wherein the reflected light from the first dichroic mirror is referred to as a second beam;
 a second dichroic mirror aligned in the path of the second beam and disposed to reflect a portion of the second beam, wherein the reflected light from the second dichroic mirror is referred to as a third beam, wherein the second dichroic mirror is aligned with the optical window in the cap such that the third beam is directed through the optical window into the chamber;
 wherein if petroleum, oil, or lubricant particles are in the water in the chamber a portion of the third beam is back-scattered back through the optical window and through the second dichroic mirror, wherein the back-scattered light is referred to as a fourth beam;
 a third dichroic mirror aligned in the path of the fourth beam and disposed to reflect a portion of the fourth beam and to allow a different portion of the fourth beam to pass through, wherein the reflected light from the third dichroic mirror is referred to as a fifth beam and the portion of the fourth beam that passes through the third dichroic mirror is referred to as the sixth beam;
 a first photo detector aligned in the path of the fifth beam and disposed to generate a first photo detector signal upon receiving the fifth beam;
 a fourth dichroic mirror aligned in the path of the sixth beam and disposed to reflect a portion of the sixth beam and to allow a different portion of the sixth beam to pass through, wherein the reflected light from the fourth dichroic mirror is referred to as a seventh beam and the portion of the sixth beam that passes through the fourth dichroic mirror is referred to as the eighth beam;
 a second photo detector; aligned in the path of the seventh beam and disposed to generate a second photo detector signal upon receiving the seventh beam;
 a third photo detector, aligned in the path of the eighth beam and disposed to generate a third photo detector signal upon receiving the eighth beam; and
 wherein the illumination source and the first, second, and third photo detectors are operatively coupled to the electronics unit.

15. The autonomous biobuoy of claim 14, wherein the bioluminescence detector comprises:
 a pump assembly having a suction end and a discharge end, wherein the pump assembly is coupled to the housing inside the second compartment;
 a light-tight test chamber having an inlet and an outlet, wherein the outlet is operatively coupled to the suction end of the pump assembly;
 a mesh filter coupled to the inlet of the test chamber such that the mesh filter filters out debris, but not bioluminescent marine organisms, from water being suctioned through the test chamber; and
 a light detector optically coupled to the test chamber such that the light detector and electronically coupled to the electronics unit, wherein the light detector is configured to send a light detector output signal to the electronics unit in response to light emitted by the bioluminescent marine organisms in the test chamber.

16. The autonomous biobuoy of claim 15, wherein the transmissometer comprises:
 a body coupled to the exterior of the housing, wherein the body comprises upper and lower protrusions with a portion of the marine biosphere therebetween;
 a light emitting diode (LED) embedded in the lower protrusion and electrically coupled to the electronics unit;
 a first transparent window sealingly separating the LED from the marine biosphere;
 a light detector embedded in the upper protrusion and electrically coupled to the electronics unit, wherein the light detector and the LED are positioned opposite each other such that the LED and the light detector are in optical communication with one another;
 a second transparent window sealingly separating the light detector from the marine biosphere; and
 wherein the discharge end of the pump assembly is aligned with the first and second transparent windows such that discharged water impinges the first and second transparent windows thereby preventing debris build-up on the first and second transparent windows.

17. The autonomous biobuoy of claim 16, wherein the detector assembly further comprises an underwater camera.

18. The autonomous biobuoy of claim 1, wherein the bioluminescence detector comprises:

a pump assembly having a suction end and a discharge end, wherein the pump assembly is coupled to the housing inside the second compartment and electrically coupled to the electronics unit;

a light-tight test chamber having an inlet and an outlet, wherein the outlet is operatively coupled to the suction end of the pump assembly;

a mesh filter coupled to the inlet of the test chamber such that the mesh filter filters out debris, but not bioluminescent marine organisms, from water being suctioned through the test chamber; and a light detector optically coupled to the test chamber and electronically coupled to the electronics unit, wherein the light detector is configured to send a light detector output signal to the electronics unit in response to light emitted by the bioluminescent marine organisms in the test chamber.

19. The autonomous biobuoy of claim 1, wherein the transmissometer comprises:

a body coupled to the exterior of the housing, wherein the body comprises upper and lower protrusions with a portion of the marine biosphere therebetween;

a light emitting diode (LED) embedded in the lower protrusion and electrically coupled to the electronics unit;

a first transparent window sealingly separating the LED from the marine biosphere;

a light detector embedded in the upper protrusion and electrically coupled to the electronics unit, wherein the light detector and the LED are positioned opposite each other such that the LED and the light detector are in optical communication with one another; and a second transparent window sealingly separating the light detector from the marine biosphere.

20. The autonomous biobuoy of claim 1, wherein the cap is made of a material having a specific gravity of less than 1000 kilograms/cubic meter.

21. The autonomous biobuoy of claim 1, further comprising a ballast material coupled to the bottom of the housing, wherein the ballast material has sufficient mass to stabilize the housing without sinking the housing thereby preventing excessive to and fro rocking.

* * * * *